US010984293B2

(12) United States Patent
Guo et al.

(10) Patent No.: US 10,984,293 B2
(45) Date of Patent: *Apr. 20, 2021

(54) IMAGE PROCESSING METHOD AND APPARATUS

(71) Applicant: Advanced New Technologies Co., Ltd., Grand Cayman (KY)

(72) Inventors: Xin Guo, Hangzhou (CN); Yuan Cheng, Hangzhou (CN); Chen Jiang, Hangzhou (CN); Zhihong Lu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,545

(22) Filed: Jan. 30, 2020

(65) Prior Publication Data

US 2020/0167612 A1 May 28, 2020

Related U.S. Application Data

(63) Continuation of application No. 16/547,735, filed on Aug. 22, 2019.

(30) Foreign Application Priority Data

Aug. 22, 2018 (CN) .......................... 201810961701.X

(51) Int. Cl.
*G06K 9/62* (2006.01)
*G06K 9/32* (2006.01)
(Continued)

(52) U.S. Cl.
CPC ......... *G06K 9/6267* (2013.01); *G06K 9/3233* (2013.01); *G06Q 40/08* (2013.01); *H04N 5/23229* (2013.01); *G06K 2209/23* (2013.01)

(58) Field of Classification Search
CPC .............. G06K 9/6267; G06K 9/3233; G06K 2209/23; H04N 5/23229; G06Q 40/08
(Continued)

(56) References Cited

U.S. PATENT DOCUMENTS 9,654,679 B1 5/2017 Veliche
2018/0096497 A1 4/2018 Bennett et al.
2018/0176633 A1* 6/2018 Yeo ........................ G06N 20/00

FOREIGN PATENT DOCUMENTS

CN 106600421 A * 4/2017
CN 107194323 A 9/2017
(Continued)

OTHER PUBLICATIONS

International Search Report and the Written opinion dated Nov. 27, 2019, in counterpart International Application No. PCT/US2019/047389.

*Primary Examiner* — Amandeep Saini
(74) *Attorney, Agent, or Firm* — Finnegan, Henderson, Farabow, Garrett & Dunner, LLP

(57) ABSTRACT

An image processing method includes: acquiring a video stream of a vehicle by a camera according to a user instruction; obtaining an image corresponding to a frame in the video stream; determining whether the image meets a predetermined criterion by inputting the image into a classification model, the classification model comprising a first convolutional neural network; in response to the image meeting the predetermined criterion, adding at least one of a target box or target segmentation information to the image by inputting the image into a target detection and segmentation model, the at least one of the target box or the target segmentation information corresponding to at least one of a vehicle part or vehicle damage of the vehicle, the target detection and segmentation model comprising a convolu-
(Continued)

tional neural network; and displaying the at least one of the target box or the target segmentation information to the user.

20 Claims, 7 Drawing Sheets

(51) Int. Cl.
*G06Q 40/08* (2012.01)
*H04N 5/232* (2006.01)

(58) Field of Classification Search
USPC .......................................................... 382/156
See application file for complete search history.

(56) References Cited

FOREIGN PATENT DOCUMENTS

| | | | | |
|---|---|---|---|---|
| CN | 107403424 A | | 11/2017 | |
| CN | 107909113 A | * | 4/2018 | |
| CN | 107909113 A | | 4/2018 | |
| WO | WO 2018/036276 A1 | | 3/2018 | |
| WO | WO 2018/196837 A1 | | 11/2018 | |
| WO | WO-2018196837 A1 | * | 11/2018 | ............. G06Q 40/08 |

\* cited by examiner

IMAGE PROCESSING METHOD AND APPARATUS

CROSS-REFERENCE TO RELATED APPLICATION

This application is a continuation of U.S. application Ser. No. 16/547,735, filed Aug. 22, 2019, which is based upon and claims priority to Chinese Application No. 201810961701.X, filed on Aug. 22, 2018, the content of both of which is incorporated herein by reference in its entirety.

TECHNICAL FIELD

Embodiments of this specification generally relates to the field of image processing technologies, and in particular, to image processing methods and apparatuses for guiding a user to take vehicle damage assessment photos.

TECHNICAL BACKGROUND

In auto insurance claim settlement scenarios, insurance companies may need to send professional inspection and damage assessment personnel to an accident site to conduct on-site inspections and damage assessments. The insurance companies can provide a vehicle repair plan and a compensation amount, take on-site photos, and keep the damage assessment photos on file for verifying the damage and cost. As the inspection and damage assessment need to be conducted manually, insurance companies have to invest a large amount of human resources and cover expenses associated with professional knowledge training. With respect to the experience of individual users, the claim settlement process involves waiting for the inspector to inspect on site and for the damage assessor to assess damage on the repair site. The process further involves waiting for the damage verifier to verify the damage. The whole claim settlement cycle is lengthy.

With the development of the Internet, other claim settlement solutions have been proposed, where a user takes vehicle damage photos on site and uploads the photos to a server. Damage assessment and claim settlement can then be performed based on the vehicle damage photos according to an algorithm or manually. However, with these solutions, the vehicle damage photos usually satisfy certain requirements. For example, the user is usually required to take vehicle damage photos from the distant to the near. In addition, there are also some requirements on the sharpness, brightness and shooting angles of the photos. In order to meet such requirements, customer service personnel of insurance companies need to communicate with the user by telephone, the internet, or other means, so that they can remotely guide the user to take photos for damage assessment.

In view of the above, more effective solutions are needed for guiding users to take photos for vehicle damage assessment.

SUMMARY

In one aspect, an image processing method for use in a mobile device, comprises: acquiring a video stream of an accident vehicle by a camera according to a user instruction; obtaining an image of a frame in the video stream; determining whether the image meets a predetermined criterion by inputting the image into a classification model, wherein the classification model includes a first convolutional neural network for use in the mobile device; in response to the image meeting the predetermined criterion, adding at least one of a target box or target segmentation information to the image by inputting the image into a target detection and segmentation model, wherein the at least one of the target box or the target segmentation information corresponds to at least one of a vehicle part or vehicle damage of the vehicle, and the target detection and segmentation model includes a second convolutional neural network for use in the mobile device; and displaying to a user the at least one of the target box or the target segmentation information.

In another aspect, a mobile device comprises: a memory storing instructions; and a processor configured to execute the instructions to: acquire a video stream of an accident vehicle by a camera according to a user instruction; obtain an image of a frame in the video stream; determine whether the image meets a predetermined criterion by inputting the image into a classification model, wherein the classification model includes a first convolutional neural network for use in the mobile device; in response to the image meeting the predetermined criterion, add at least one of a target box or target segmentation information to the image by inputting the image into a target detection and segmentation model, wherein the at least one of the target box or the target segmentation information corresponds to at least one of a vehicle part or vehicle damage of the vehicle, and the target detection and segmentation model includes a second convolutional neural network for use in the mobile device; and display to a user the at least one of the target box or the target segmentation information.

In another aspect, a non-transitory computer-readable medium stores instructions that, when executed by a processor of a mobile device, cause the mobile device to perform an image processing method, the method comprising: acquiring a video stream of an accident vehicle by a camera according to a user instruction; obtaining an image of a frame in the video stream; determining whether the image meets a predetermined criterion by inputting the image into a classification model, wherein the classification model includes a first convolutional neural network for use in the mobile device; in response to the image meeting the predetermined criterion, adding at least one of a target box or target segmentation information to the image by inputting the image into a target detection and segmentation model, wherein the at least one of the target box or the target segmentation information corresponds to at least one of a vehicle part or vehicle damage of the vehicle, and the target detection and segmentation model includes a second convolutional neural network for use in the mobile device; and displaying to a user the at least one of the target box or the target segmentation information.

Based on the image processing solutions according to the embodiments of this specification, blurred images, images obtained under poor light intensity, non-vehicle damage pictures and other images in an actual video stream can be effectively filtered out through an image classification algorithm with low computational load. The image processing solutions can therefore help users determine which images can be taken. An image detection and segmentation algorithm can help users determine which images are recognizable to the algorithm. A forward or backward prompt can be given to the user until applicable photos can be taken. At the same time, an association between the photos taken by users can be calculated through multiple algorithms based on characteristics of the video stream. Accordingly, richer and more reliable information can be provided to a background algorithm engine, thereby improving accuracy and robustness.

BRIEF DESCRIPTION OF THE DRAWINGS

Embodiments of this specification are further described below with reference to the accompanying drawings.

DETAILED DESCRIPTION

Figure 1:
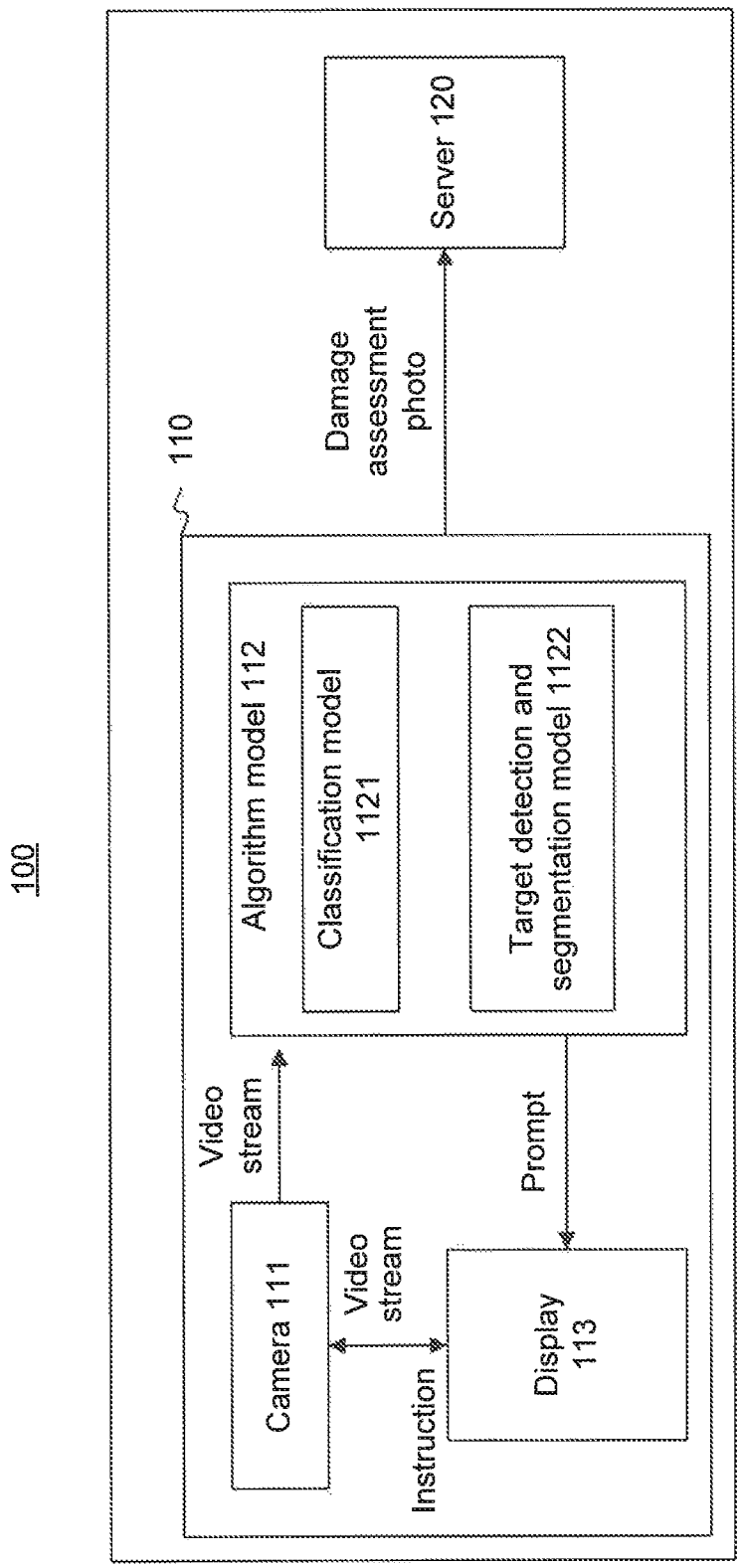
FIG. 1 is a schematic diagram of an image processing system according to an embodiment.

Embodiments are described in detail in the following and are illustrated in the accompanying drawings. It is appreciated that the embodiments described below and illustrated in the drawings are examples only. They do not constitute any limitations on the scope of the present disclosure.

FIG. 1 shows a schematic diagram of an image processing system 100 according to an embodiment. As shown in FIG. 1, the system 100 includes a mobile device 110 and a server 120. The mobile device 110 can be, for example, a mobile phone, a smart device capable of communication, or the like. The server 120 can be, for example, a server used by an insurance company to process damage assessment photos. The mobile device 110 includes a camera 111 and a display 113. In addition, the mobile device 110 is provided with a mobile terminal algorithm model 112. The algorithm model 112 includes a classification model 1121 and a target detection and segmentation model 1122. The system 100 can be used to guide a user to take damage assessment photos of a vehicle and upload them to the server for processing. For example, with the system 100, a damage assessor of an insurance company is not required to arrive at the scene of a vehicle accident. Instead, the user of the damaged vehicle involved in the accident can use a mobile device (such as the mobile device 110) to take photos according to tips and prompts of a claim settlement APP. Qualified damage assessment photos can be obtained and uploaded to the server 120.

In the process of photo shooting, first of all, the user opens a shooting interface in the APP for auto insurance claim settlement (i.e., issuing an instruction to the camera) through, for example, a button on the display 113. The display 113 can be, for example, a touch screen. Through the shooting interface, the APP invokes the camera 111 to acquire a video stream, inputs the video stream into the algorithm model 112 for processing, and displays the video stream on the display 113 at substantially the same time. As noted above, the algorithm model 112 includes the classification model 1121 and the target detection and segmentation model 1122. The classification model 1121 is configured to perform basic classification of input image frames, for example, the classification can involve determining whether the image frames are blurred and whether the light intensity is sufficient. The target detection and segmentation model 1122 is configured to add a target box and/or segmentation information to the input image frames. The segmentation information can show target pixel-level segmentation results.

After a current frame in the video stream is input into the algorithm model 112, an image of the current frame can be first classified by the classification model 1121. Based on the classification result, a prompt can be shown on the display 113 to prompt the user to perform a corresponding operation, such as stabilizing the camera. When the classification result from the classification model 1121 for the image of the current frame satisfies a predetermined criterion, a target box and/or segmentation information can be added to the image by the target detection and segmentation model 1122. At the same time, the target box and/or the segmentation information can also be displayed on the frame of image shown on the display 113. The user can be prompted accordingly. For example, the user can be prompted to move forward or backward. When the result from the target detection and segmentation model 1122 satisfies the predetermined criterion, a prompt can be shown on the display 113 to prompt the user to take photos. The user clicks a shoot button on the display 113 to take photos, and qualified damage assessment photos can be obtained. The damage assessment photos taken by the user can be uploaded to the server 120. At the server 120, the damage assessment photos uploaded by the user can be processed using a trained damage assessment algorithm model, to obtain a damage assessment result.

It is appreciated that the structure of the system 100 shown in FIG. 1 is merely an example, and the systems provided in this specification are not limited to the structure shown in FIG. 1. For example, the display can be a non-touch screen, and the damage assessment result may not be obtained through an algorithm in the server 120 but manually determined based on the damage assessment photos. In addition, the algorithm model 112 can also include various algorithms for obtaining an association between frames in the video stream, to obtain an association between multiple damage assessment photos that are taken.

Figure 2:
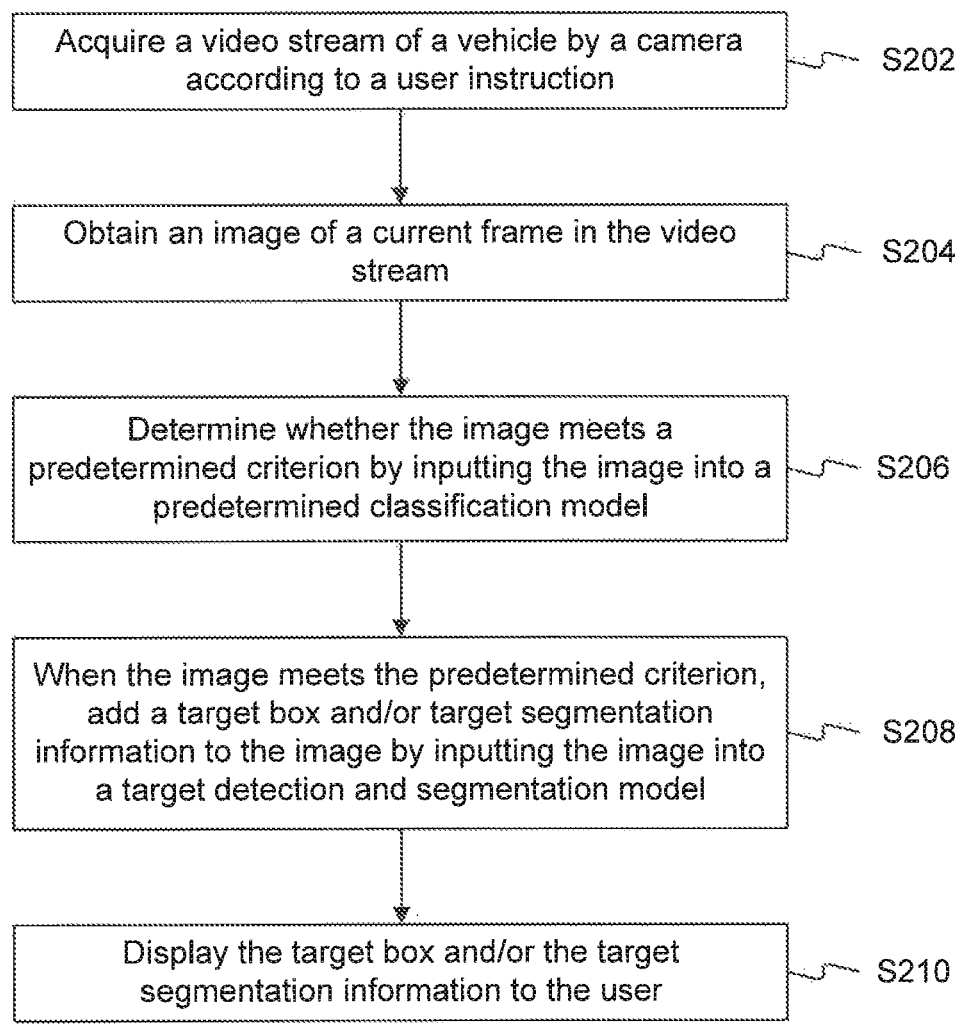
FIG. 2 is a flowchart of an image processing method according to an embodiment.

FIG. 2 is a flowchart of an image processing method 200 according to an embodiment. The method 200 can be performed by a mobile device that includes a camera. As shown in FIG. 2, the method 200 includes the following steps.

In step S202, a video stream of a vehicle is acquired by a camera according to a user instruction. The vehicle can be a vehicle damaged in an accident.

In step S204, an image of a current frame in the video stream is obtained.

In step S206, it is determined whether the image meets a predetermined criterion by inputting the image into a predetermined classification model. The predetermined classification model can include a convolutional neural network for use in the mobile device.

In step S208, when the image meets the predetermined criterion, a target box and/or target segmentation information are added to the image by inputting the image into a target detection and segmentation model. The target box and the target segmentation information each correspond to at least one of a vehicle part or vehicle damage of the vehicle. The target detection and segmentation model can include a convolutional neural network for use in the mobile device.

In step S210, the target box and/or the target segmentation information are/is displayed to the user.

As noted above, in step S202, a video stream of an accident vehicle is acquired by the camera according to a user instruction. The mobile device can be, for example, a mobile phone. For example, a user can take damage assessment photos of the damaged vehicle by using an auto insurance claim settlement APP installed on his/her mobile phone. This may involve the user opening a shooting interface through a camera icon in the APP and pointing the camera at the vehicle. After the shooting interface is opened, images captured by the camera as well as a button for taking photos can be displayed on the screen of the mobile phone. This process can be similar to the shooting interface of the camera feature of the mobile phone. The images continuously acquired by the camera form a video stream. When the video stream is displayed on the screen of the mobile phone by the APP as described above, the video stream can also serve as real-time input into various algorithm models deployed in the APP on the mobile phone. In an embodiment, the camera can be configured to acquire one frame of image at a predetermined interval (for example, 125 ms), to reserve computation/operation time for the algorithm model(s).

In an embodiment, after the user enters the shooting interface, the APP first presents a general shooting flow to the user on the screen to help the user understand steps of the whole shooting process. After that, the App displays the video stream acquired by the camera on the screen. For example, processes related to the shooting can be demonstrated in the form of pictures, text, sounds, and the like. The user can perform operations according to prompt(s) of the APP, such as taking photos according to a prompt of the APP, uploading the photos, and so on.

In step S204, an image of a current frame in the video stream is obtained. The current frame in the video stream refers to an image currently acquired by the camera, that is, an image currently displayed on the screen of the mobile phone. After acquiring the video stream of the vehicle by the camera, the APP can determine frames in the video stream that can be input into the model according to the model processing time. For example, each frame of image in the video stream can be obtained for model analysis, or one frame of image can be obtained from every few frames in the video stream to be input into the model for analysis.

In step S206, it is determined whether the image meets a predetermined criterion by inputting the image into a predetermined classification model, wherein the predetermined classification model includes a convolutional neural network for use in the mobile device.

As described above with reference to FIG. 1, a lightweight image classification model can be deployed on the mobile phone for fast local processing of vehicle images in the video stream. For example, the predetermined classification model can be a multi-task classification model trained by using a mobile device-based model that includes a convolutional neural network, such as a MobileNet v2, ShuffleNet, or SqueezeNet. For example, the classification model can be trained by using a large number of tagged vehicle damage photos. The vehicle damage photos can include multiple tags related to whether the photo is blurred, whether the photo includes vehicle damage, whether the light intensity is sufficient, whether the shooting angle is skewed, whether the shooting distance is appropriate, etc., in order to carry out multi-task learning. In the above mentioned MobileNet v2 model, for example, by optimizing a two-dimensional convolution network, model parameters can be effectively reduced and the computation efficiency can be improved, so that such an algorithm can be deployed in the mobile terminal. The optimization can include, for example, superposing multiple small convolution kernels to achieve the same effect as a large convolution kernel so that the parameters used can be reduced exponentially. Further, general two-dimensional convolution operations can be replaced with depth-wise separable convolution to reduce the number of the parameters, and so on.

The trained classification model as stated above can, for example, classify the image based on at least one of the following conditions: whether the image is blurred, whether the image includes vehicle damage, whether the light intensity is sufficient, whether the shooting angle is skewed (e.g., whether the shooting angle is a tilted angle such as a high angle or an oblique angle), whether the shooting distance is appropriate, and so on. Thus, based on the classification result from the classification model, it can be determined whether the image meets predetermined basic requirements for vehicle damage assessment photos. It is appreciated that the image classification performed by the classification model is not limited to the above listed types, and corresponding classification can be added based on the application requirements.

In the case where the image does not meet the predetermined criterion, the APP can prompt the user correspondingly based on the classification result from the model.

For example, when the classification model determines that the image is blurred, the user can be provided with the following prompt: the image is blurred; please stabilize the camera. When the classification model determines that the image does not include vehicle damage, the user can be prompted to aim the camera at the location of the damage. When the classification model determines that the image is not obtained with sufficient light intensity, the user can be prompted that the light intensity is not enough. When the classification model determines that the shooting angle of the image is excessively skewed, the user can be prompted to take a photo facing the damage location. When the shooting distance is too far, the user can be prompted to approach the vehicle, and so on.

Figure 3:
FIG. 3 is a schematic diagram of a text prompt on a screen of a mobile phone based on a model classification result according to an embodiment.

The above prompts may be in the form of a text prompt displayed on the screen, or in a voice format, or provided by displaying a text and playing a corresponding voice at the same time. FIG. 3 shows a schematic diagram of a text prompt on a screen of a mobile phone according to a model classification result. As shown in FIG. 3, after the shooting interface is opened, it can be detected by the classification model that the shooting distance of the image of the current frame is far. Based on the detection result, as shown in FIG. 3, the prompt "It is too far; please approach the vehicle" is displayed at the bottom of the screen.

Referring back to FIG. 2, in step S208, when the image meets the predetermined criterion, a target box and/or target segmentation information are added to the image by inputting the image into a target detection and segmentation model. The target box and the target segmentation information each correspond to at least one of a vehicle part or vehicle damage of the vehicle. The target detection and segmentation model includes a convolutional neural network for use in the mobile device.

As noted above with reference to FIG. 1, a target detection and segmentation model can be deployed on the mobile phone to detect a vehicle part and damage of the vehicle in the video stream. The target box and the target segmentation information can be displayed on the screen of the mobile phone. The target detection and segmentation model can be a lightweight convolutional neural network model for use in a mobile terminal, which can be implemented by, for example, MobileNet v2+SSDLite, or MobileNet v2+DeepLab v3, MaskRCNN, etc. In an embodiment, the target detection and segmentation model and the classification model include a shared underlying convolutional neural network. In an embodiment, the target detection and segmentation model can be obtained by training with a large number of labeled (with a target box or segmentation information) vehicle damage images. In the training samples, vehicle parts or damage areas of vehicles are labeled to train the target detection and segmentation model for detecting vehicle parts and vehicle damage.

After an image meets the predetermined criterion for vehicle damage assessment photos, the image can be input into the trained target detection and segmentation model as described above. The target detection and segmentation model can automatically detect vehicle parts and/or vehicle damage in the image, and can further add the target box and/or the target segmentation information to a target position.

In step S210, the target box and/or the target segmentation information are/is displayed to the user.

Figure 4:
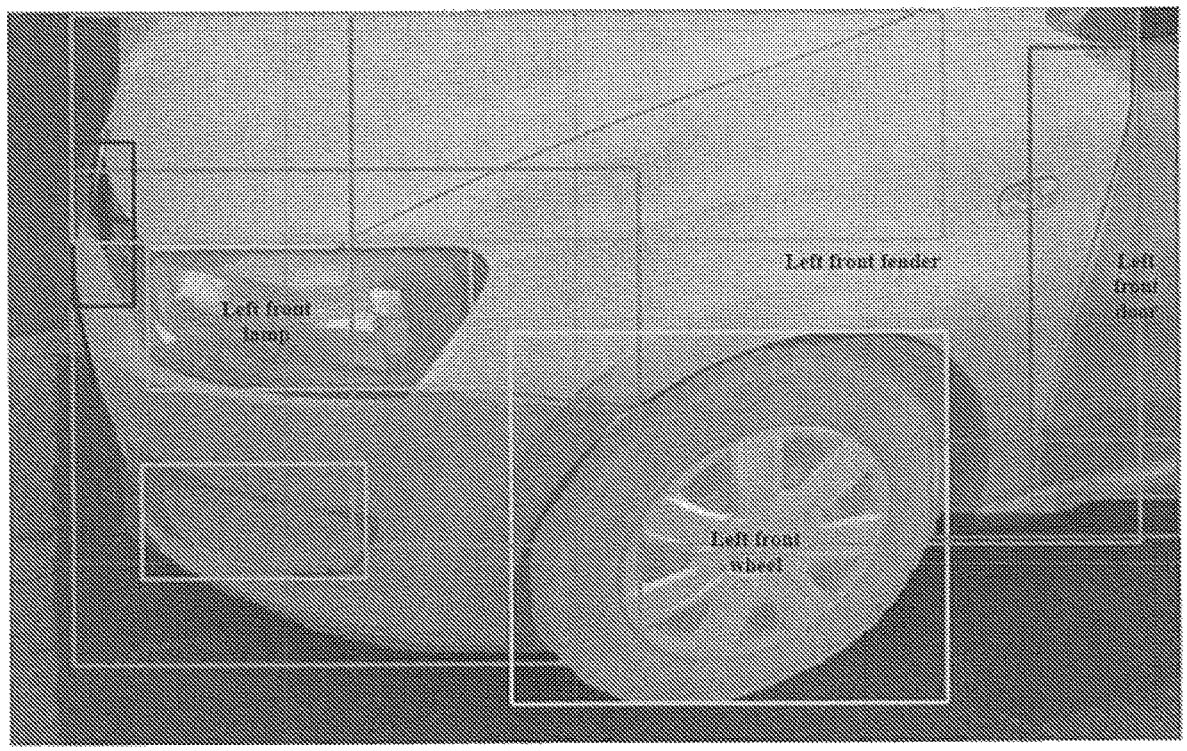
FIG. 4 is a schematic diagram illustrating a target box and/or target segmentation information displayed on the screen according to an embodiment.

After the target box and/or the target segmentation information are added to the image in the model, the target box and/or the target segmentation information can be displayed, through the screen of the mobile phone, on the currently displayed image. For example, target boxes associated with different parts (or different damage) can be displayed in different colors. Further, different parts (or different damage) can also be displayed in different colors to show segmentation information of the different parts (or different damage). FIG. 4 is a schematic diagram illustrating a target box and/or target segmentation information displayed on the screen according to an embodiment. As shown in FIG. 4, different gray scales represent different colors and, for example, target boxes in different colors are added to the left front wheel and the left front lamp, respectively. As another example, the left front fender and the left front door are respectively filled with different colors (the different colors can be used to indicate the target segmentation information). In an embodiment of this specification, target detection and target segmentation can be carried out for each vehicle part (or damage) at the same time. Alternatively and/or additionally, target detection can be carried out for each vehicle part, and target segmentation can be carried out for each damage, etc., in order to distinguish the parts and damage for display.

The target detection and segmentation model on the mobile phone can be used to directly detect, on the mobile phone, vehicle damage and parts in the image of the current frame, and visualize them on the screen of the mobile phone. That way, it can help the user to directly perceive them and have a basic understanding about the detection result that can be obtained based on the current image on the server side. Further, it can help the user determine images from which vehicle part information can be obtained accurately using an algorithm, and images from which damage information can be obtained accurately using an algorithm. According to the target box and the target segmentation information displayed on the screen, the user can appropriately adjust the shooting process. For example, the user can move the position of the mobile phone so that the target box corresponding to the damage is displayed on the screen. That way, damage assessment photos can be taken properly.

In an embodiment, after the target box and/or the target segmentation information are added to the image, the user can be prompted correspondingly based on the target box and/or the target segmentation information. For example, the user can be prompted to move forward or backward based on whether the image includes the target box and/or the target segmentation information of the damage, as well as the detected parts, the amount of damage/number of damage areas, and other information. When the APP determines, based on a processing result of the target detection and segmentation model, that the image meets predetermined requirements for damage assessment photos, the user can be prompted to take a photo. Thus, by clicking the shoot button on the shooting interface, the user can obtain a vehicle damage assessment photo corresponding to the image of the current frame. After the user clicks the shoot button, the APP can save the damage assessment photo taken by the user into a phone album of the mobile phone or into the APP. After obtaining the damage assessment photo, the APP can upload the damage assessment photo to the server automatically or upload the photo to the server based on an operation of the user. On the shooting interface, the user can move the mobile phone to aim at multiple damage positions on the vehicle, and can take photos multiple times based on the APP tips/prompts as mentioned above to obtain multiple damage assessment photos. The APP can upload the multiple damage assessment photos together after the user takes all the damage assessment photos or upload a single damage assessment photo each time the damage assessment photo is taken.

In an embodiment, the method shown in FIG. 2 further includes, after the damage assessment photo corresponding to the image of the current frame is obtained and based on the video stream, obtaining an association between the image of the current frame and a first image. The first image is an image, taken by the user, of a frame before the current frame in the video stream. In other words, the APP can obtain, based on the video stream, an association between multiple damage assessment photos taken. As described above with reference to FIG. 1, various algorithms for obtaining the association can be deployed on the mobile phone.

As described above, the user can take photos multiple times on the shooting interface to obtain multiple damage assessment photos. As the video stream includes rich information, it can be used to establish an association among various damage assessment photos. For example, an association between the damage assessment photo corresponding to the image of the current frame and each damage assessment photo taken previously can be obtained.

In an embodiment, the association includes dynamic information between frames constructed according to multiple FlowNets. For example, a first damage assessment image (photo) corresponding to the image of the current frame is processed by FlowNet1, a second damage assessment image (for example, an image frame before the current frame) is processed by FlowNet2. An optical flow between the first damage assessment image and the second damage assessment image can be obtained based on fusion of output from FlowNet1 and FlowNet2.

Figure 5A:
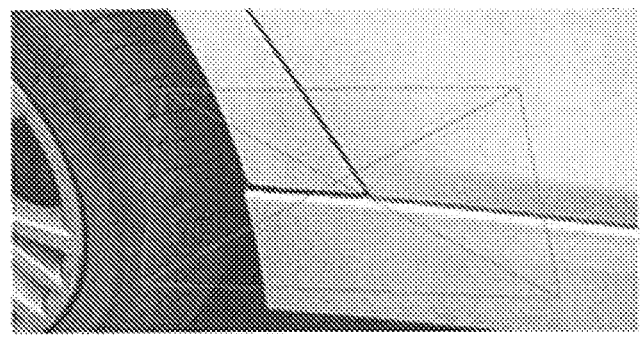
FIGS. 5A-5C illustrate an effect of a mapping matrix according to an embodiment.
Figure 5B:
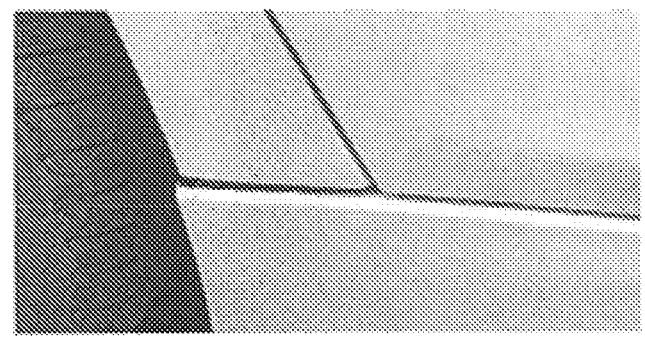
Figure 5C:
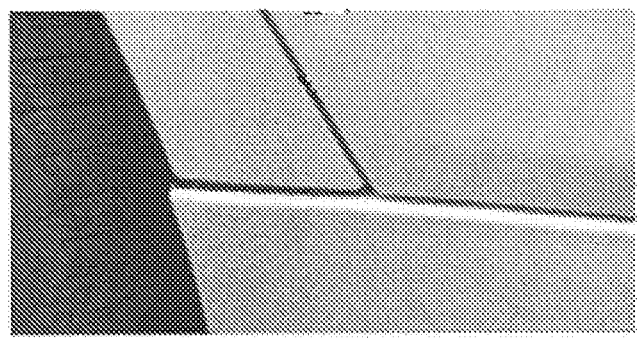

In an embodiment, the association includes a mapping matrix between frames. In an algorithm for obtaining a mapping matrix between frames, an image gradient and an image difference between an image 1 and an image 2 are first calculated. A mapping matrix between the image 1 and the image 2 can be obtained through least square optimization and Cholesky decomposition. For example, the image 1 and the image 2 are the first damage assessment image and the second damage assessment image described above, respectively. FIGS. 5A-5C illustrate an effect of a mapping matrix according to an embodiment. For example, FIG. 5A is the image 1; FIG. 5C is the image 2; and FIG. 5B is an image 1' obtained by transforming the image 1 by using a mapping matrix. The mapping matrix is a mapping matrix from the image 1 to the image 2. Thus, the image 1' transformed through the mapping matrix is consistent with the image 2.

In an embodiment, the association includes a shooting position and angle transformation relation between the frames calculated by using SLAM technology.

After the association between multiple damage assessment images (photos) is obtained as described above, the association can be uploaded to the server as relevant information. The server assesses damage based on the damage assessment images and the association between the damage assessment images, so that a more accurate and reliable damage assessment result can be obtained.

Figure 6:
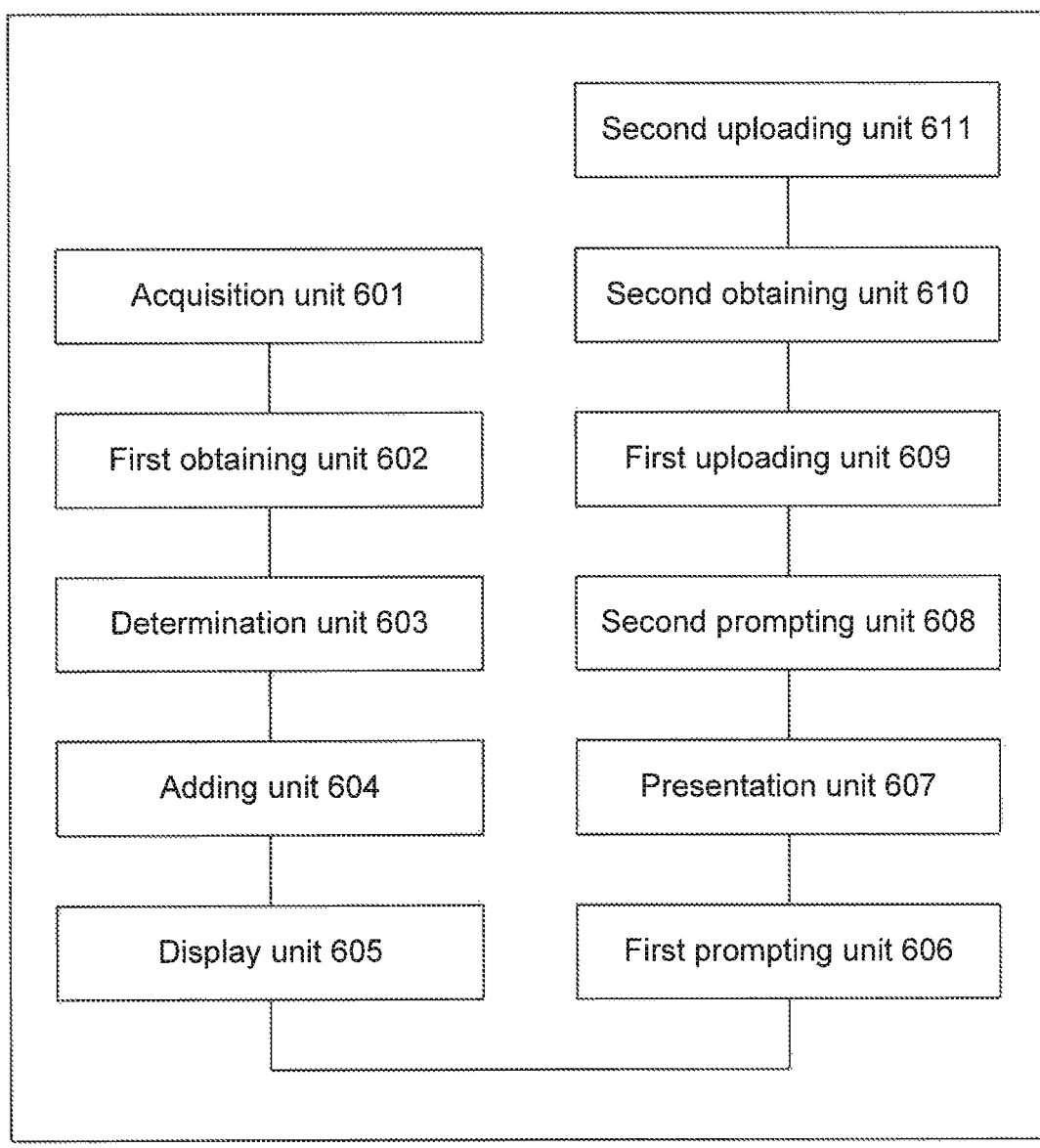
FIG. 6 is a schematic diagram of an image processing apparatus according to an embodiment.

FIG. 6 is a schematic diagram of an image processing apparatus 600 according to an embodiment. The apparatus 600 can be implemented at a mobile device that includes a camera. The apparatus 600 includes:

an acquisition unit 601 configured to acquire a video stream of a vehicle damaged in an accident by the camera according to a user instruction;

a first obtaining unit 602 configured to obtain an image of a current frame in the video stream;

a determination unit 603 configured to determine whether the image meets a predetermined criterion by inputting the image into a predetermined classification model, wherein the predetermined classification model includes a convolutional neural network for use in the mobile device;

an adding unit 604 configured to, if the image meets the predetermined criterion, add a target box and/or target segmentation information to the image by inputting the image into a target detection and segmentation model, wherein the target box and the target segmentation information each correspond to at least one of vehicle parts or vehicle damage of the vehicle, and the target detection and segmentation model includes a convolutional neural network for use in the mobile device; and a display unit 605 configured to display the target box and/or the target segmentation information to the user.

In an embodiment, the image processing apparatus 600 further includes a first prompting unit 606 configured to, if the image does not meet the predetermined criterion, prompt the user correspondingly based on a classification result from the classification model.

In an embodiment, the image processing apparatus 600 further includes a presentation unit 607 configured to present a shooting flow to the user before the video stream of the accident vehicle is acquired by the camera.

In an embodiment, the image processing apparatus 600 further includes a second prompting unit 608 configured to prompt the user correspondingly based on the target box and/or the target segmentation information, after the target box and/or the target segmentation information are/is added.

In an embodiment, in the image processing apparatus 600, the second prompting unit 608 is further configured to prompt the user to move forward or backward based on the target box and/or the target segmentation information.

In an embodiment, in the image processing apparatus 600, the second prompting unit 608 is further configured to prompt the user to shoot based on the target box and/or the target segmentation information, to obtain a damage assessment photo corresponding to the image of the current frame.

In an embodiment, the image processing apparatus 600 further includes a first uploading unit 609 configured to upload the damage assessment photo to a server after the damage assessment photo corresponding to the image of the current frame is obtained.

In an embodiment, the image processing apparatus 600 further includes a second obtaining unit 610 configured to obtain, based on the video stream, an association between the image of the current frame and a first image, after the damage assessment photo corresponding to the image of the current frame is obtained, wherein the first image is an image taken by the user of a frame before the current frame in the video stream.

In an embodiment, the image processing apparatus 600 further includes a second uploading unit 611 configured to upload the association to a server after the association between the image of the current frame and the first image is obtained.

Each of the above described units and models may be implemented as software, or hardware, or a combination of software and hardware. For example, each of the above described units and models may be implemented using a processor executing instructions stored in a memory. Also, for example, each of the above described units and models may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Figure 7:
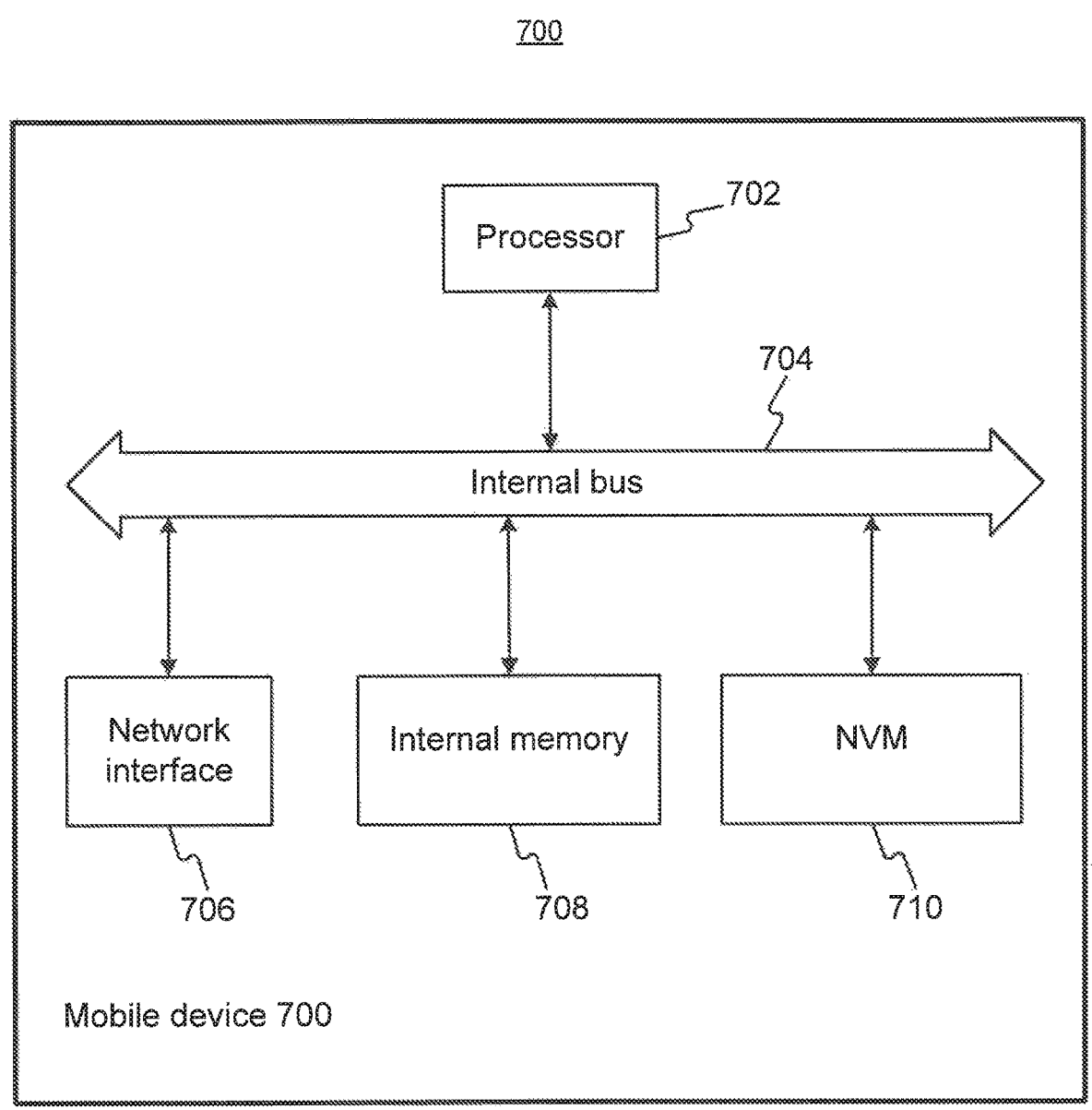
FIG. 7 is a schematic diagram of a mobile device according to an embodiment.

FIG. 7 is a schematic diagram of a mobile device 700 according to an embodiment. For example, the device 700 may be any of the mobile devices described above. Referring to FIG. 7, the device 700 includes a processor 702, an internal bus 704, a network interface 706, and a memory such as an internal memory 708 and a nonvolatile memory (NVM) 710. The processor 702 may include one or more dedicated processing units, application-specific integrated circuits (ASICs), field-programmable gate arrays (FPGAs), or various other types of processors or processing units. The processor 702 is configured to execute instructions or executable codes stored in the memory for performing the above described image processing methods.

In an embodiment, there is also provided a non-transitory computer-readable medium storing instructions that, when executed by a processor of a mobile device, cause the mobile device to perform the above described image processing methods.

In the image processing solutions according to the embodiments of this specification, blurred images, images obtained under poor light intensity, non-vehicle damage pictures and other images in an actual video stream can be effectively filtered out through an image classification algorithm with low computational load, thus helping users confirm which images can be taken. An image detection and segmentation algorithm can help users determine which images are recognizable to the algorithm and provide a forward or backward prompt so that usable images can be taken. At the same time, an association between the photos taken by users is calculated through multiple algorithms by using characteristics of the video stream, thus providing richer and more reliable information to a background algorithm engine for achieving more accurate and robust effects.

Various embodiments in this specification are described above. For description of certain parts of an embodiment, reference can be made to the same or similar parts in other embodiments. Each embodiment may focus on aspects that are different from other embodiments. Further, the system embodiments are described in a relatively concise manner as the procedures involved may be similar to those of the method embodiments. Therefore, for related parts, reference can be made to the description with respect to the method embodiments.

Several embodiments of this specification are described in the foregoing. It is appreciated that other embodiments can be implemented based on the specification, which shall all fall within the scope defined in the appended claims. Under some circumstances, the actions or steps described above may be performed in a sequence different from those described above. In addition, the processes depicted in the accompanying drawings may be performed in a different order or sequence from those illustrated. Further, multitask processing and parallel processing may also be applied in some implementations.

It is appreciated that the units and algorithm steps of the embodiments described herein can also be implemented by electronic hardware, computer software or a combination thereof. Compositions and steps in several embodiments have been described above based on different functions performed, which illustrate interchangeability between the hardware and the software. Whether the functions are executed by hardware or software depends on specific applications and design constraints in the actual implementation of the technical solutions.

Steps of the methods or algorithms described in combination with the embodiments disclosed herein can be implemented by hardware, a processor-executed software module, or a combination thereof. The software module may be built in a random access memory (RAM), an internal memory, a read-only memory (ROM), an electrically programmable ROM, an electrically erasable programmable ROM, a register, a hard disk, a removable disk, a CD-ROM, or any other forms of storage mediums known in the technical field.

The above description provides only examples of the specification and is not intended to limit the specification. Various changes and modifications can be made to the embodiments by those skilled in the art, consistent with the specification. Any modifications, equivalent substitutions, improvements, etc. made within the spirit and scope of the specification shall all fall within the scope defined in the appended claims.

What is claimed is:

1. An image processing method for use in a mobile device, comprising:
   obtaining an image corresponding to a frame in a video stream of a vehicle;
   inputting the image into a classification model and determining, based on a classification result, whether the image meets a predetermined criterion, the classification model comprising a first convolutional neural network for use in the mobile device;
   in response to the image meeting the predetermined criterion, adding at least one of a target box or target segmentation information to the image, the at least one of the target box or the target segmentation information corresponding to at least one of a vehicle part or vehicle damage of the vehicle; and
   displaying to a user the at least one of the target box or the target segmentation information.

2. The image processing method of claim 1, further comprising:
   in response to the image not meeting the predetermined criterion, prompting the user based on the classification result from the classification model.

3. The image processing method of claim 1, wherein the classification model classifies the image based on at least one of: whether the image is blurred, whether the image includes vehicle damage, whether a light intensity is sufficient, whether a shooting angle is skewed, or whether a shooting distance is appropriate.

4. The image processing method of claim 1, further comprising:
   presenting a shooting flow to the user before the video stream of the vehicle is acquired by a camera of the mobile device.

5. The image processing method of claim 1, further comprising:
   prompting the user based on the at least one of the target box or the target segmentation information.

6. The image processing method of claim 5, wherein the prompting the user based on the at least one of the target box or the target segmentation information comprises:
   prompting the user to move forward or backward based on the at least one of the target box or the target segmentation information.

7. The image processing method of claim 5, wherein the prompting the user based on the at least one of the target box or the target segmentation information comprises:
   prompting the user to shoot based on the at least one of the target box or the target segmentation information, to obtain a damage assessment photo corresponding to the image of the frame.

8. The image processing method of claim 7, further comprising:
   uploading the damage assessment photo to a server.

9. The image processing method of claim 7, further comprising:
   obtaining, based on the video stream, an association between the image and a first image, wherein the first image is an image of a first frame before the frame in the video stream.

10. The image processing method of claim 9, wherein the association comprises at least one of: an optical flow, a mapping matrix, or a position and angle transformation relation between the image and the first image.

11. The image processing method of claim 9, further comprising:
    uploading the association to the server.

12. The image processing method of claim 1, wherein the adding at least one of a target box or target segmentation information to the image comprises inputting the image into a target detection and segmentation model, the target detection and segmentation model including a second convolutional neural network for use in the mobile device,
    wherein the first convolutional neural network and the second convolutional neural network are a same convolutional neural network shared by the classification model and the target detection and segmentation model.

13. A mobile device, comprising:
    a memory storing instructions; and
    a processor configured to execute the instructions to:
      obtain an image corresponding to a frame in a video stream of a vehicle;
      input the image into a classification model and determine, based on a classification result, whether the image meets a predetermined criterion, the classification model comprising a first convolutional neural network for use in the mobile device;
      if the image meets the predetermined criterion, add at least one of a target box or target segmentation information to the image, the at least one of the target box or the target segmentation information corresponding to at least one of a vehicle part or vehicle damage of the vehicle; and
      display to a user the at least one of the target box or the target segmentation information.

14. The mobile device of claim 13, wherein the processor is further configured to execute the instructions to:

in response to the image not meeting the predetermined criterion, prompt the user based on the classification result from the classification model.

15. The mobile device of claim 13, wherein the classification model classifies the image based on at least one of: whether the image is blurred, whether the image includes vehicle damage, whether a light intensity is sufficient, whether a shooting angle is skewed, or whether a shooting distance is appropriate.

16. The mobile device of claim 13, wherein the processor is further configured to execute the instructions to:
present a shooting flow to the user before the video stream of the vehicle is acquired by a camera of the mobile device.

17. The mobile device of claim 13, wherein the processor is further configured to execute the instructions to:
prompt the user based on the at least one of the target box or the target segmentation information.

18. The mobile device of claim 17, wherein the prompting the user based on the at least one of the target box or the target segmentation information comprises:
prompting the user to move forward or backward based on the at least one of the target box or the target segmentation information.

19. The mobile device of claim 17, wherein the prompting the user based on the at least one of the target box or the target segmentation information comprises:
prompting the user to shoot based on the at least one of the target box or the target segmentation information, to obtain a damage assessment photo corresponding to the image of the frame.

20. A non-transitory computer-readable medium storing instructions that, when executed by a processor of a mobile device, cause the mobile device to perform an image processing method, the method comprising:
obtaining an image corresponding to a frame in a video stream of a vehicle;

inputting the image into a classification model and determining, based on a classification result, whether the image meets a predetermined criterion, the classification model comprising a first convolutional neural network;

if the image meets the predetermined criterion, adding at least one of a target box or target segmentation information to the image, the at least one of the target box or the target segmentation information corresponding to at least one of a vehicle part or vehicle damage of the vehicle; and displaying to a user the at least one of the target box or the target segmentation information.

* * * * *